UNITED STATES PATENT OFFICE.

ADOLPH J. OTTO AND THOMAS J. BRENNAN, OF PAWTUCKET, RHODE ISLAND.

COMPOUND FOR STOPPING PUNCTURES IN PNEUMATIC TIRES.

SPECIFICATION forming part of Letters Patent No. 689,622, dated December 24, 1901.

Application filed May 29, 1901. Serial No. 62,390. (No specimens.)

*To all whom it may concern:*

Be it known that we, ADOLPH J. OTTO and THOMAS J. BRENNAN, residing at Pawtucket, in the county of Providence and State of Rhode Island, have invented certain new and useful Improvements in Compounds for Stopping Punctures or Air-Outlets in Pneumatic Tires; and we do declare the following to be a full, clear, and exact description of the invention, such as will enable others skilled in the art to which it appertains to make and use the same.

The special object of our invention is to disclose a reliable compound by which punctures in the pneumatic tires of bicycles, automobiles, or other vehicles may be effectually stopped, so as to practically endure as long as the tire itself. In order to accomplish this object, we have taken a base which when mixed with water will stop the leak, but has such a tendency to solidification that it cannot be kept in a liquid state, so as to be ready for use at any time. By careful experiment we have ascertained that the desired end may be obtained by mixing with it certain ingredients which will preserve the solution as a liquid for an indefinite time.

The base to which we allude is plaster-of-paris, and the ingredients which we mix with it are as follows: aluminium, ammonia, soap, and coloring-matter, together with water enough to form a solution. These ingredients are agitated or churned for about fifteen minutes until they are intimately mixed. The proportions are one pound of plaster-of-paris, one and one-half ounces of liquid ammonia, three drams of aluminium powder, and one-half ounce of melted soap.

It will be readily perceived that our liquid contains no rubber or oil, and therefore requires no evaporation, no congelation, no coagulation. It may be preserved or sold in any water-tight vessel for any length of time and always be ready for immediate use.

We have tires (old, worn, and leaky) in which several months ago we made many perforations with a cobbler's awl and then treated them with our repair compound. These tires have held the air perfectly ever since that time, although they have been subject to constant use in all weather.

In treating a tire which has been punctured or from which the air leaks we proceed as follows: The compound or paste is first reduced by water to the consistency of cream and injected so as to coat the inner surface of the tire, where it remains in a moist state until a puncture occurs. It then exudes through the puncture, exhibiting a drop of moisture on the outside, which being removed the filling becomes solidified to a great extent and impermeable to air.

This compound is a fine polish for gold, silver, nickel, brass, or polished glass, while by the addition of two ounces of liquid glue to the gallon it forms a hard-surface paint for plastered walls, wood, glass, or paper. With all moisture evaporated or removed it becomes a powder; but we propose to sell it in the form of a paste in air-tight tin cans.

Having thus described all that is necessary to a full understanding of our invention, what we claim as new, and desire to protect by Letters Patent, is—

A compound for stopping tire-punctures which consists of aluminium, ammonia, plaster-of-paris, dissolved soap and water in about the proportions set forth.

In testimony whereof we affix our signatures in presence of two witnesses.

ADOLPH J. OTTO.
THOMAS J. BRENNAN.

Witnesses:
JAMES FITZPATRICK,
THOMAS H. DUFFY.